United States Patent Office 3,025,279
Patented Mar. 13, 1962

3,025,279
COPOLYMERS OF TRIFLUOROETHYL VINYL ETHER AND FLUOROALKYL ACRYLATES, AND PROCESS FOR PREPARING SAME
John T. Barr, Neshaminy, Pa., assignor to Pennsalt Chemicals Corporation, a corporation of Pennsylvania
No Drawing. Filed June 29, 1955, Ser. No. 518,929
9 Claims. (Cl. 260—86.1)

This invention relates to new polymeric compositions and to processes for the preparation of these new compositions.

At the present time there are a number of fluorine-containing organic polymers available commercially. Each of these possesses useful properties, but each one also has one or more serious drawbacks, such as high cost of manufacture, difficulty of preparation and application and limited field of application.

It has now been found that an unsaturated ester represented by the structure $CHX=CYCOOZ$, where X is hydrogen, alkyl or carbalkoxy, Y is hydrogen, lower alkyl or chlorine, Z is alkyl or halogenated alkyl of 1 to 12 carbon atoms can be copolymerized with 2,2,2-trifluoroethyl vinyl ether to produce new polymeric compositions which combine valuable properties and a wide field of application with low cost and ease of preparation and application. A preferred class of unsaturated esters is represented by the structure $CH_2=CHCOOCH_2[CXY]_nZ$ where X and Y may be hydrogen, fluorine or chlorine, Z may be hydrogen, fluorine, chlorine, methyl or halogenated methyl, and $n$ is an integer from 1 to 8.

More particularly, this invention provides new elastomers possessing a very wide thermal working range and superior resistance to chemicals and solvents. The monomers used are potentially inexpensive raw materials, and they copolymerize readily and completely. The resultant copolymers can be cured to rubbers possessing outstanding characteristics.

In practicing the process of this invention an unsaturated ester and trifluoroethyl vinyl ether are mixed and subjected to polymerization conditions. Although emulsion polymerization conditions are preferred, other known polymerization techniques such as mass, solution or suspension polymerization may also be used.

In a preferred embodiment of my invention the two monomers are mixed with water, an emulsifying agent and a catalyst or polymerization initiator and the mixture agitated at ordinary or slightly elevated temperatures. The degree and rate of polymerization may advantageously be controlled by varying the amount of catalyst used and the temperature.

The proportions of unsaturated ester and of trifluoroethyl vinyl ether used may be varied over a wide range within the scope of the invention, depending on the properties desired in the copolymer. For example, desirable copolymers containing as little as 1% of one monomer and 99% of the other may be prepared according to my invention, but at least 5% of each monomer is preferred.

The copolymerization reaction according to my invention may be carried out over a wide range of temperature. Thus, when using an emulsion polymerization technique, the temperature may be varied from below 0° C. to approximately the critical temperature of the monomers. Using mass polymerization techniques, even higher temperatures may be employed. Generally, however, preferred products are obtained using emulsion polymerization at temperatures between 0° C. and 100° C. and preferably between 20 and 60° C.

The amount of water used in carrying out the polymerization is not critical, but for practical purposes it is preferred to use an amount of from 1 to 3 times the combined weights of the monomers.

A number of suitable emulsifying agents are known to the art and many of these may be used in this process. A few examples of emulsifying agents which have been used successfully in carrying out the process of this invention are Triton X–100, an alkyl aryl polyether alcohol, Triton X–200, the sodium salt of an alkyl aryl polyether sulfonate, and Duponol WA, the active ingredient of which is sodium lauryl sulfate. The amount of emulsifying agent may be varied from about 0.1% to about 15% of the combined weights of the monomers, although the preferred amount is from 1% to 10%.

A number of materials are known to the art as emulsion polymerization catalysts or initiators and almost any of these may be used. A few examples of such materials are oxygen, ozone, hydrogen peroxide, benzoyl peroxide, cumene hydro-peroxide and other organic peroxides, organic ozonides, percarbonates, perborates, perchlorates, and persulfates. The preferred catalysts in the practice of my invention are ammonium, sodium or potassium persulfate. The speed of the polymerization reaction is partially dependent on the amount of catalyst used, and in operating the process of my invention it has been found that the amount of catalyst may be varied from as little as 0.1% to as much as 4% of the combined monomer weights although the preferred amount is from 0.5% to 2.5%.

It is clear to those skilled in the art that since the temperature and amount of catalyst affect the rate of reaction, they also affect the reaction time. With this understood, it becomes apparent that the reaction time can be varied over a wide range, depending upon the particular conditions used and the degree of polymerization desired. In general a reaction time of from 5 to 60 hours has been found to be suitable and practical although good results may also be obtained using less than 5 hours or longer than 60 hours.

Auxiliary polymerization agents known to the art, although not essential to the operation of my invention may be used to advantage.

For example, a small amount of sodium bisulfite added initially helps to activate the polymerization catalyst and thus promotes the start of the reaction. A small amount of buffer such as borax is also helpful in preventing changes in pH caused by slight hydrolysis of the reactants. A small amount of a mercaptan such as tertiary dodecyl mercaptan is effective in regulating the polymer molecular weight and preventing the formation of excessively high molecular weight products from certain monomer pairs.

Polymeric products made according to my invention include copolymers of trifluoroethyl vinyl ether and unsaturated esters of aliphatic alcohols and unsaturated esters of halogenated alcohols.

The organic acids which form the basis for the esters which are useful in my polymerization process are of the acrylic and substituted acrylic type.

Representative acids are acrylic, methacrylic, α-chloroacrylic, α-fluoroacrylic, maleic, fumaric, crotonic, aconitic.

The organic alcohols which combine with the acrylic acid residue to form the esters represented by the following: methyl, ethyl, trifluoroethyl, pentafluoropropyl, heptafluorobutyl, sec. butyl, isobutyl, butyl, sexyl, octyl, 1,1-dihydroperfluorooctyl, lauryl, 3,4-dichloro-3,4,4-trifluorobutyl.

The esters formed by the acid and alcohol moieties which copolymerize with 2,2,2-trifluoroethyl vinyl ether to give the useful polymers of my invention are represented by the following compounds: ethyl acrylate, trifluoroethyl acrylate, heptafluorobutyl acrylate, dichlorotrifluorobutyl acrylate, lauryl acrylate, trifluoroethyl methacrylate, trifluoroethyl α-chloroacrylate, dichlorotrifluorobutyl α-chloroacrylate, isobutyl methacrylate, 1,1-dihydroperfluorobutyl α-chloroacrylate, bis (trifluoroethyl) maleate, bis (trifluoroethyl) fumarate, trifluoroethyl 1,1-dihydroperfluorooctyl fumarate, ethyl dichlorotrifluorobutyl maleate, trifluoroethyl crotonate, tris (trifluoroethyl) aconitate, trifluoroethyl α-fluoroacrylate.

It is to be understood that my invention is applicable to many other related compounds not herein enumerated.

Although the object of my invention is to make available new copolymers and processes for preparing these copolymers, it is to be understood also that in some cases the products of my invention may contain homopolymers of each of the comonomers in addition to the said copolymers. This is particularly true when the copolymerization reaction is carried out using only a small proportion of one of the comonomers and a large proportion of the other.

In general the copolymers of my invention which have the most valuable properties are rubbery solids, although valuable products ranging from viscous liquids to hard solids at ordinary temperatures may also be prepared, depending on the application desired, by varying the degree of polymerization.

Rubbers prepared by curing copolymers of this invention have outstanding resistance to solvents, oils, oxygen, sunlight, heat, aging and chemicals, and are particularly useful where resistance to these is necessary, as for example, in the chemical process and allied industries. Examples of especially valuable applications include gaskets, packings, flexible piping, hoses, linings, coatings, chemically resistant gloves and boots, etc.

From the foregoing disclosure it is clear that the new polymeric products and rubbers of this invention possess important characteristics not possessed by polymers heretofore available, and can be used to advantage in a large number of commercial products.

The invention and its practice are further illustrated by the following examples, in which the parts are by weight.

EXAMPLE 1

A pressure reactor was charged with 49.6 parts of trifluoroethyl vinyl ether, 50.4 parts of trifluoroethyl acrylate, 180 parts of water, 3.0 parts of Duponol ME, 1.13 parts of potassium persulfate, 0.5 part of sodium bisulfite, 0.5 part of borax, and 0.2 part of tertiary dodecyl mercaptan and closed. The reactor was then agitated at 50° C. for 40 hours. 67.5 parts of a soft, rubbery solid was obtained.

EXAMPLE 2

A pressure reactor was charged with 50 parts of trifluoroethyl vinyl ether, 50 parts of trifluoroethyl arcylate, 150 parts of water, 3.0 parts of Triton X-100 and 0.5 part of potassium persulfate and closed. The reactor was then agitated at 25° C. for 40 hours. 69 parts of firm, rubbery polymer was obtained.

EXAMPLE 3

A pressure reactor was charged with 25 parts of trifluoroethyl vinyl ether, 75 parts of trifluoroethyl acrylate, 180 parts of water, 3.0 parts of Duponol ME, 1.13 parts of potassium persulfate, 0.5 part of sodium bisulfite, 0.5 part of borax and 0.2 part of tertiary dodecyl mercaptan and closed. The reactor was then agitated at 25° C. for 40 hours. 96.5 parts of rubbery polymer was obtained.

EXAMPLE 4

A pressure reactor was charged with 50 parts each of trifluoroethyl acrylate and trifluoroethyl vinyl ether, 180 parts of water, 3.0 parts of Duponol ME, 1.13 parts of potassium persulfate, 0.5 part of sodium bisulfite and 0.5 part of borax and closed. The reactor was then agitated at 25° C. for 40 hours. 77 parts of firm, rubbery polymer was obtained.

EXAMPLE 5

A pressure reactor was charged with 51 parts of trifluoroethyl vinyl ether, 49 parts of trifluoroethyl acrylate, 227 parts of water, 4.54 parts of Triton X-100 and 2.27 parts of potassium persulfate and closed. The reactor was then agitated at 50° C. for 28 hours. 70.5 parts of a strong rubbery polymer was obtained. 100 parts by weight of this polymer was then mixed with 1 part of paraffin, 35 parts of finely divided carbon, 1 part of sulfur, and 1 part of triethylene tetramine and cured 30 minutes at 154° C. and 500 pounds per square inch pressure. A strong, soft rubber was obtained. Strips of the rubber were exposed to various chemicals and solvents and were apparently not affected by hydrocarbons, halogenated solvents, acids, bases, or aqueous solutions. Exposure for over 90 hours at 250° C. in an ester-type hydraulic fluid caused no apparent damage.

EXAMPLE 6

A glass reaction vessel was charged with 10 parts each of trifluoroethyl vinyl ether and bis(trifluoroethyl) maleate, and a solution of 0.5 part $K_2S_2O_8$ and 1.0 part Triton X-100 in 50 parts $H_2O$. The vessel was rotated 19 hours at 50° C. After opening the vessel, the solids were coagulated by an acid salt solution, filtered and dried at 50° C. to give 13.5 parts of a soft, rubbery product. A portion of this was cured by means of a standard black-loaded polyamine compound to a strong sheet.

EXAMPLE 7

A charge similar to that above, except substituting a like amount of bis (trifluoroethyl) fumarate for the maleate ester gave under similar reaction conditions, 15 parts of a hard, thermoplastic resin that could be molded to a strong, somewhat flexible sheet.

EXAMPLE 8

The following test polymerizations were carried out. The amounts are given in parts by weight. The reaction time was 17 hours at 50° C.

Table 1

| Experiment | Ethyl acrylate | Trifluoroethyl vinyl ether | Recipe | Yield | Product |
|---|---|---|---|---|---|
| 1 | 76 | 4 | A[1] | 75.5 | Soft, rubbery plug. |
| 2 | 76 | 4 | A | 77.0 | Do. |
| 3 | 72 | 8 | A | 72.5 | Do. |
| 4 | 57 | 3 | B[2] | 55 | Rubbery crumb. |
| 5 | 54 | 6 | B | 54 | Do. |

[1] Recipe A—Water—100, monomers—80, Aerosol OT—2, and $K_2S_2O_8$—1.
[2] Recipe B—Water—118, Monomers—60, Duponol ME—2.5, Borax—2, $K_2S_2O_8$—1, $NaHSO_3$—1, and t-$C_{12}H_{25}SH$—0.25.

The product of experiments 1 and 2 were combined and cured in the following compound: copolymer, 100 parts; Silene EF, 50 parts; paraffin and sulfur, 1 part each; triethylene tetramine, 1.5 parts. Thirty minutes curing time at 315° C. gave a slightly undercured sheet which nevertheless possessed good physical properties. These are listed in Table II together with properties after 168 hours immersion at 350° F. in Turbo-oil 15.

The product of experiment 3 was cured in a similar compound, except that 2.0 parts methyl Tuads was substituted for the sulfur. The properties of the vulcanizate are also given in Table II.

Table II
ORIGINAL

| Polymer | Tensile (p.s.i.) | Elongation (percent) | Hardness |
|---|---|---|---|
| Ex. 1 and 2 | 590 | 900 | 67 |
| Ex. 3 | 680 | 820 | 67 |

AFTER AGING

| Polymer | Tensile (p.s.i.) | Elongation (percent) | Hardness | Cracking |
|---|---|---|---|---|
| Ex. 1 and 2 | 190 | 470 | 44 | None. |
| Ex. 3 | 260 | 430 | 40 | Do. |

These rubbers have shown excellent utility as O-rings, gaskets and hose lines for fuels, oils, hydraulic fluids and corrosive liquids.

EXAMPLE 9

Following the procedure of Example 2, the copolymers shown in Table III were prepared. Standard curing techniques using a sulfur-polyamine recipe gave good rubber with either black or silica reinforcement.

Table III

| Trifluoroethyl vinyl ether, parts | Comonomer | Parts | Yield | Product |
|---|---|---|---|---|
| 50 | $CH_2=\underset{CH_3}{C}-COOCH_2CF_3$ | 50 | 92 | Tough, rubbery mass |
| 25 | $CH=\underset{Cl}{C}COOCH_2C_3F_7$ | 75 | 53 | Hard rubber. |
| 50 | $CH_2=\underset{CH_3}{C}COOCH_2CH_2CFClCF_2Cl$ | 50 | 85 | Soft, rubber. |
| 50 | $CH_2=\underset{Cl}{C}COOCH_2C_7F_{15}$ | 50 | 67 | Rubbery crumb. |
| 25 | $CH_2=\underset{Cl}{C}COOCH_2CF_3$ $CH_2=\underset{Cl}{C}COOCH_2C_7F_{15}$ | 60 15 | 90 | Soft rubber. |
| 45 | $CH_2=CClCOOCH_2CF_3$ $CH_2=CHCOOC_{16}H_{33}$ | 45 10 | 94 | Do. |

Many widely different embodiments of this invention may be made without departing from the scope and spirit of it and it is to be understood that my invention includes all such embodiments and is not to be limited by the above description.

I claim:

1. Copolymers containing from 1 to 99 mol percent of 2,2,2-trifluoroethyl vinyl ether and 99 to 1 mol percent of a monomer represented by the structure $$CH=\underset{Y}{\overset{}{C}}-COO-CH_2-Z$$
$$\phantom{CH=}\underset{}{\overset{X}{|}}$$

where X is a member selected from the group consisting of hydrogen, methyl and carbalkoxy groups, Y is a member selected from the group consisting of hydrogen, halogen and methyl groups, and Z is a perfluoroalkyl group containing from one to seven carbon atoms.

2. Copolymers of 5 to 55 mol parts of 2,2,2-trifluoroethyl vinyl ether and 95 to 45 mol parts of the compound represented by the structure $$CH_2=CH-COOCH_2CF_3$$

3. Copolymers of 5 to 55 mol parts of 2,2,2-trifluoroethyl vinyl ether and 95 to 45 mol parts of the compound represented by the structure $$CH_2=\underset{CH_3}{\overset{}{C}}-COOCH_2CF_3$$

4. Copolymers of 5 to 55 mol parts of 2,2,2-trifluoroethyl vinyl ether and 95 to 45 mol parts of the compound represented by the structure $$CH_2=\underset{Cl}{\overset{}{C}}-COOCH_2CF_3$$

5. Copolymers of 5 to 55 mol parts of 2,2,2-trifluoroethyl vinyl ether and 95 to 45 mol parts of the compound represented by the structure $$CH_2=CH-COOCH_2-C_7F_{15}$$

6. Copolymers of 5 to 55 mol parts of 2,2,2-trifluoroethyl vinyl ether and 95 to 45 mol parts of the compound represented by the structure $$CH_2=\underset{Cl}{\overset{}{C}}-COOCH_2-C_3F_7$$

7. The process of preparing new polymeric products which comprises mixing from 99 to 45 mol parts of the monomer represented by the structure of claim 1 with from 1 to 55 mol parts of 2,2,2-trifluoroethyl vinyl ether in the presence of from about 0.1 to 2.5% of a polymerization initiator and reacting said mixture at a temperature between about 0° and about 100° C.

8. The process of claim 7 wherein the monomers are 2,2,2-trifluoroethyl vinyl ether and a compound having the structure $CH_2=CH-COOCH_2CF_3$.

9. The process of claim 7 wherein the monomers are 2,2,2-trifluoroethyl vinyl ether and a compound having the structure $$CH_2=\underset{CH_3}{\overset{}{C}}-COOCH_2CF_3$$

References Cited in the file of this patent
UNITED STATES PATENTS

| | | |
|---|---|---|
| 2,016,490 | Fikentscher | Oct. 8, 1935 |
| 2,047,398 | Voss et al. | July 14, 1936 |
| 2,642,416 | Ahlbrecht et al. | June 16, 1953 |
| 2,682,527 | Dickey et al. | June 29, 1954 |
| 2,732,370 | Codding | Jan. 24, 1956 |